(12) United States Patent
Katayama et al.

(10) Patent No.: US 6,499,690 B1
(45) Date of Patent: Dec. 31, 2002

(54) ROTOR BLADE FLAP DRIVE APPARATUS

(75) Inventors: Noriaki Katayama, Kakamigahara (JP); Tatsuro Hongu, Kakamigahara (JP); Eiichi Yamakawa, Kakamigahara (JP)

(73) Assignee: Advanced Technology Institute of Commuter-Helicopter, Ltd., Gifu (JP)

( * ) Notice: Subject to any disclaimer, the term of this patent is extended or adjusted under 35 U.S.C. 154(b) by 0 days.

(21) Appl. No.: 09/673,980

(22) PCT Filed: Feb. 24, 2000

(86) PCT No.: PCT/JP00/01044

§ 371 (c)(1),
(2), (4) Date: Dec. 6, 2000

(87) PCT Pub. No.: WO00/50303

PCT Pub. Date: Aug. 31, 2000

(30) Foreign Application Priority Data

Feb. 25, 1999 (JP) .......................................... 11-048917

(51) Int. Cl.[7] .............................................. B64C 27/00
(52) U.S. Cl. .................................................. 244/17.11
(58) Field of Search ................. 244/215, 211, 244/212, 219, 17.11, 201, 204, 72, 11.22; 74/99 R

(56) References Cited

U.S. PATENT DOCUMENTS

| 2,716,460 | A | * | 8/1955 | Young ........................ 244/214 |
| 5,224,826 | A | * | 7/1993 | Hall et al. .............. 310/323.17 |
| 5,387,083 | A | * | 2/1995 | Larson et al. ................. 416/23 |
| 5,570,859 | A | * | 11/1996 | Quandt ....................... 244/113 |
| 5,626,312 | A | | 5/1997 | McDonell |
| 5,639,215 | A | * | 6/1997 | Yamakawa et al. ......... 244/212 |
| 6,168,379 | B1 | * | 1/2001 | Bauer ......................... 244/215 |
| 6,231,013 | B1 | * | 5/2001 | Jaenker ...................... 244/215 |
| 6,295,006 | B1 | * | 9/2001 | Kohlhepp ................ 244/17.11 |
| 6,200,096 | B1 | * | 3/2002 | Kohlhepp .................... 416/24 |

FOREIGN PATENT DOCUMENTS

| EP | 0734947 | 10/1996 |
| GB | 2299562 | 10/1996 |
| JP | 10-271852 | 10/1998 |
| JP | 11-227696 | 8/1999 |

* cited by examiner

Primary Examiner—Peter M. Poon
Assistant Examiner—Kevin Jakel
(74) Attorney, Agent, or Firm—Wenderoth, Lind & Ponack, L.L.P.

(57) ABSTRACT

Displacements of output portions 35, 36 of a pair of piezoelectric actuators 25, 26 arranged spanwise in a flap drive apparatus are magnified by a displacement magnification mechanism 27 so that a swing arm 28 is driven in swinging fashion with large amplitude. A flap 22 attached to the trailing edge of a blade 21 by way of a connecting rod 30 connected to a tip of the swing arm 28 is driven in vertical angular displacement fashion. The displacement magnification mechanism 27 possesses an eccentric shaft 40 has a first shaft 41 and second shaft 42 with offset axes. An output portion 35 is coupled to the first shaft 41, and an output portion 36 is coupled to the second shaft 42. The swing arm 28 is fixed to the eccentric shaft 40. Displacement of the output portions 35, 36 of the actuators 25, 26 in opposite phase results in a stable swing of the swing arm 28.

11 Claims, 14 Drawing Sheets

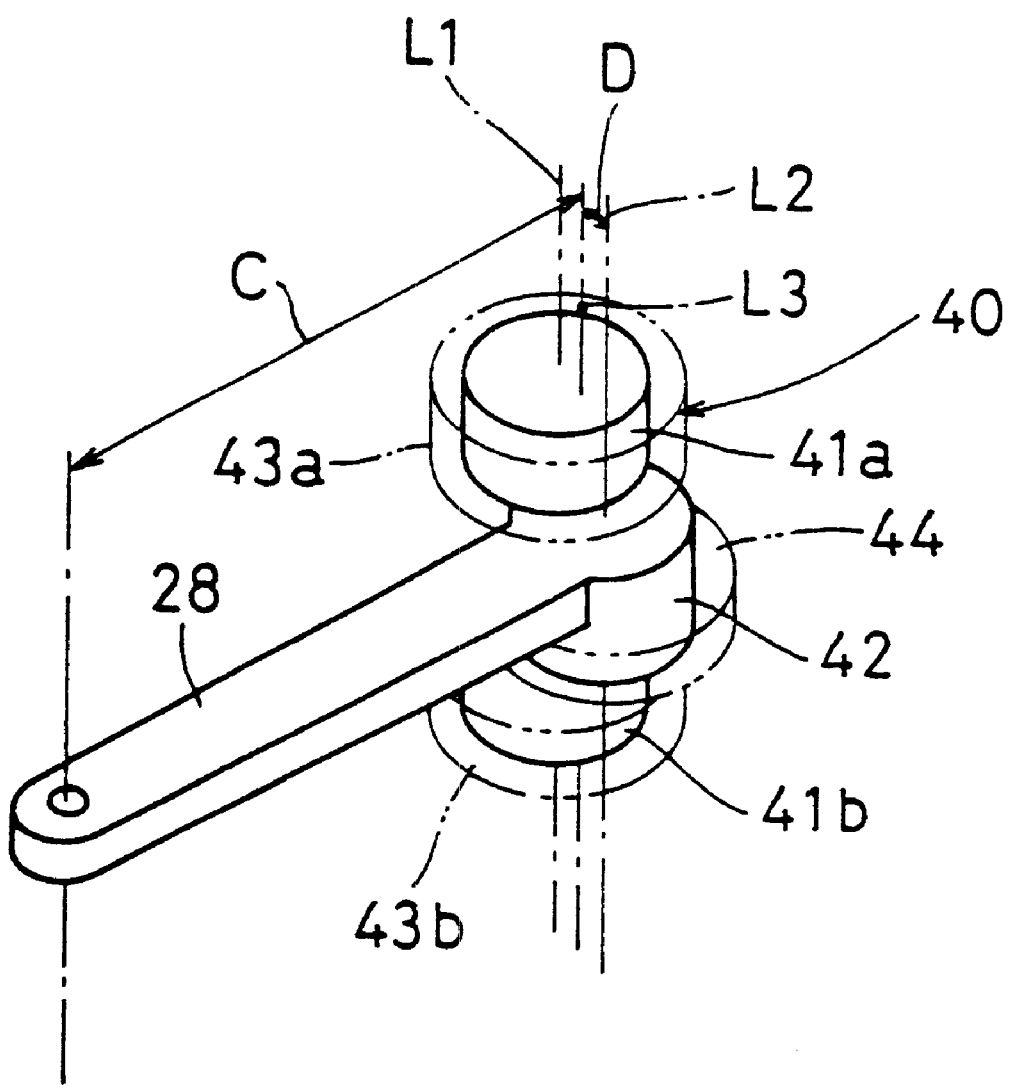

ROTOR BLADE FLAP DRIVE APPARATUS

BACKGROUND OF THE INVENTION

1. Technical Field

The present invention relates to a rotor blade flap drive apparatus that drives a flap provided at a trailing edge of each rotor blade in a helicopter or the like.

2. Background Art

In recent years, demand has increased for commuter helicopters that take off and land at urban heliports. To realize this operation, noise reduction of helicopters is strongly required. As one effective means for accomplishing such a noise reduction strategy, a technique is contemplated wherein a flap is attached to a helicopter rotor blade and drives those flap at a high speed of approximately 30 Hz to 50 Hz in order to improve aerodynamic characteristics of the rotor blade.

As an apparatus for realizing high-speed driving of a flap in this manner, the present applicant has proposed the rotor blade flap drive apparatus of Japanese Patent Application No. 10-076246 (1998). In order to be housed within the blade, an actuator employed by the flap drive apparatus should be small and lightweight, and in the aforementioned rotor blade flap drive apparatus a piezoelectric actuator is used as the actuator therein. Because piezoelectric actuator displacement is very small, in driving the flap, actuator displacement is magnified by means of a displacement magnification mechanism.

FIG. 16 is a plan view showing one example of such a conventional rotor blade flap drive apparatus 1, and FIG. 17 is a side view thereof. In the rotor blade flap drive apparatus 1, an eccentric shaft 3 is employed as a displacement magnification mechanism 2. Eccentric shaft 3 possesses a first shaft 12 and a second shaft 13 having mutually eccentric axes 10, 1, and a bearing 4 which supports the first shaft 12 is fixed relative to the blade. Output portions 6a, 7a of two actuators 6, 7 are coupled by way of a coupling member 14 to a bearing 5 which supports the second shaft 13. Fixed to this eccentric shaft 3 is a swing arm 8, and a connecting rod 9, which is, coupled to the tip of this swing arm 8, is connected to-the flap.

Simultaneous extension/contraction of the two actuators 6, 7 causes reciprocating angular displacement of the eccentric shaft 3 about the axis 10 of the first shaft 12, which is supported fixedly relative to the blade, resulting in large lead-lag swing of the swing arm 8 which is fixed to this eccentric shaft 3. Swing of the swing arm 8, which is thus made to swing-in a lead and lag direction with large amplitude, is transmitted by way of the connecting rod 9 to the flap, resulting in the flap motion in vertical reciprocating angular displacement fashion.

In order to obtain a large driving force with such a flap drive apparatus 1, the two actuators 6, 7 are employed, as has been described above, and the respective actuators 6, 7 are driven in synchronous fashion. The output portions 6a, 7a of the two actuators 6, 7 are fixed together in an integral fashion by the coupling member 14, and are coupled to the bearing 4 for the second shaft 13 of the eccentric shaft 3. Accordingly, while there is no Ads problem when the two actuators 6, 7 are displaced in proper synchronous fashion, even a slight disagreement in synchronization will result in slight distortion at the periphery of the eccentric shaft 3, causing a large reduction in the displacement magnification factor and resulting in swing instability. Furthermore, it is extremely difficult to control the actuators 6, 7, which are displaced at high speed, such that they are synchronized with high precision.

SUMMARY OF THE INVENTION

The object of the present invention is to provide a rotor blade flap drive apparatus having a simple construction and being capable of causing stable swing of a swing arm in a displacement magnification mechanism.

The invention provides a rotor blade flap drive apparatus comprising: a flap attached to a trailing edge of a blade so as to permit vertical angular displacement, and a pair of actuators housed within the blade and having output portions which are displaced in mutually reverse phases. A swing arm has a base portion which forms a side end of the actuator and is coupled to the respective output portions of the pair of actuators so as to be angularly disposed, and has a tip that swings in a lead and lag direction, and which is at a side opposite to the base portion. A connecting rod connects the tip of the swing arm and the flap.

In accordance with the present invention, the two actuators have output portions that are displaced in mutually reverse phase. That is, when one of the actuators is extended the other actuator contracts, and conversely, when one of the actuators contracts the other actuator is extended.

Accordingly, the tip of the swing arm, the base portion of which is coupled to the output portions of two such actuators, will as a result hereof swing in a lead and lag. direction with large amplitude, and the swing of the swing arm will, by way of the connecting rod, cause vertical reciprocating angular displacement of the flap.

With the above-described conventional flap drive apparatus, the two actuators are extended/contracted simultaneously in synchronous fashion and the output portions are fixedly coupled. Therefore, even a slight disagreement in synchronization causes the swing arm to no longer swing smoothly but rather to become unstable. In contrast, in the present invention swing is made to occur such that the output portions of the two actuators are displaced so as to be mutually reverse in phase. Therefore, the swing arm swings about an imaginary central swing axis located centrally between respective output portions. Accordingly, even when the phases of the two actuators are not exactly reverse but are in slight disagreement, the location of the imaginary central axis of swing of the swing arm will simply be displaced slightly and there will be no reduction in displacement magnification factor, permitting automatic adjustment of swing. The swing arm can thus be made to swing stably through employment of a simple structure.

Furthermore, in the conventional method, the angle of the swing arm would be changed in the event that a large centrifugal force caused application of a compressive force on the actuator and slight contraction of the actuator. However, the present invention has the advantage that because the angle of the swing arm will remain unchanged, there is no need to take into account the effect of the magnitude of the centrifugal force on the angle of the swing arm.

Moreover, because in the invention the swing arm is made to swing through use of the difference in phase between the output portions of two actuators (as compared with the conventional structure wherein actuators are simultaneously extended/contracted in synchronous fashion), it is possible to achieve output displacement magnification relative to actuator displacement that are approximately two times those of flap drive apparatuses having conventional structures.

In the invention it is preferable that the apparatus comprises an eccentric shaft in which a first shaft and a second shaft have axes that are mutually parallel and are mutually eccentric in a direction perpendicular to the axial direction, and the shafts are connected end-to-end in the axial direction to form an integral structure. A first support supports the first shaft so as to permit angular displacement, and the first support is coupled to the output portion of a first one of the actuators. A second support supports the second shaft so as to permit angular displacement, and the second support is coupled to the output portion of the second one of the actuators. The swing arm is fixed to a periphery of the eccentric shaft perpendicularly with respect to the eccentric shaft.

In accordance with the present invention, actuator displacement is magnified by the eccentric shaft and the swing arm which is fixed to the eccentric shaft. Because the magnification factor is determined by the ratio between the amount of eccentricity and the length of the swing arm, the amount of eccentricity must be made small in order to reduce the size of construction and increase the size of the magnification factor. Furthermore, the first shaft and the second shaft, as well as the first bearing and the second bearing which support these, must inevitably be made large for stable driving of the swing arm. Arranging the first and second shafts in parallel would also make it unavoidable for the amount of eccentricity to be made large. However, the invention permits the amount of eccentricity to be made as small as possible and the magnification factor to be made as large as possible as a result of the fact that the first shaft and the second shaft are connected end-to-end in the axial direction to form an integral structure. Furthermore, this also makes it possible for the first bearing and the second bearing, which support the respective shafts, to be arranged such that they are offset in the axial direction, permitting stable support.

Furthermore, in the invention it is preferable that the swing arm comprises a tip that swings in a lead and lag direction, and a base portion having two axes extending vertically and arranged such that they are spaced apart in the lead-lag direction. The output portion of a first one of the actuators is coupled to one of the lead-wise and lag-wise base portion axes so as to permit angular displacement, and the output portion of the second one of the actuators is coupled to the other of the lead-wise and lag-wise base portion axes so as to permit angular displacement.

In accordance with the invention, respective output shafts of the two actuators arranged in the lead and lag direction are coupled to the base portion of the swing arm so as to permit angular displacement. Accordingly, displacing the respective output shafts in opposite directions such that they are reverse in phase causes the tip of the swing arm to swing in a lead and lag direction with a large amplitude, and causes the flap to be driven vertically in a reciprocating angular displacement fashion by way of the connecting rod which is connected to the tip. The swing arm can thus be driven stably through employment of such a simple construction.

In the invention, it is further preferable that the swing arm comprises a pair of links, with a base portion of a first one of the links being coupled to the output portion of a first one of the actuators so as to permit angular displacement, and a base portion of the second one of the links being coupled to the output portion of the second one of the actuators so as to permit angular displacement. A tip of the first one of the links and a tip of the second one of the links are coupled so as to permit angular displacement, and the connecting rod is connected to these tips.

In accordance with the present invention, the swing arm is constructed in a so-called toggle-link fashion, which is to say that base portions of respective links are coupled to the output portions of the respective actuators so as to permit angular displacement, and the tips are coupled to each other. With such a toggle-link-type swing arm as well, displacing respective actuator output portions in reverse phase causes the tip to swing in a lead and lag direction with a large amplitude, and causes the flap to be driven vertically in a reciprocating angular displacement fashion by way of the connecting rod which is connected to the tip. In this way, the output portions displaced in reverse phase and the toggle-link-type swing arm permits stable swinging drive of a swing arm.

Moreover, in the invention it is preferable that the apparatus comprises linear guide means mounted within the blade so as to allow the output portion of one of the actuators to undergo displacement only along a-displacement direction of the actuator thereof but preventing the output portion from undergoing displacement in a direction perpendicular to the displacement direction of the actuator.

In accordance with the present invention, because the output portion of one of the actuators undergoes displacement properly in a linear direction through the use of a linear guide means, the reactive force of the flap which acts by way of the connecting rod is generated by the linear guide means, permitting the swing arm to be driven stably and properly. Because the construction is such that the swing arm is made to swing as a result of causing the respective output portions which are coupled to the base portions of the swing arm to provide linear displacement so as to be more or less mutually parallel and reverse in phase, the paths of motion of the respective output portions are not perfectly parallel lines but paths of motion that bulge slightly in the central region in the displacement direction. Accordingly, by providing linear guide means at the output portion of only one of the actuators and not at the other, a slight difference in path of motion is allowed, permitting the swing arm to be driven stably and properly.

Furthermore, in the invention it is preferable that the apparatus comprises a spring member intervening between the swing arm and the blade. This causes action, when the swing arm is angularly displaced to either side of a neutral position thereof, of a spring force in such a direction to encourage such angular displacement.

In accordance with the invention, when the swing arm is angularly displaced to either side past its neutral position, a spring force from the spring member causes encouragement of that angular displacement, and rapid angular displacement to the full-stroke position on that side is obtained. Conversely, when the swing arm is angularly displaced from this side to the other side, past the neutral position, angular displacement to the other side is encouraged. Accordingly, by causing a lead-lag swing of the swing arm centered on its neutral position through the use of the actuators, it is possible to enable the swing arm to undergo reliable, rapid reciprocating angular displacement through its full stroke. It is thus possible to improve response through employment of such a simple construction.

Furthermore, this spring force acts so as to cancel the hinge moment acting on the flap and so as to assist driving of the flap by the actuators.

Moreover, in the invention it is preferable that the apparatus comprises a spring member intervening between the flap and the blade, for causing action, when the flap is angularly displaced to either side of a neutral position thereof, of a spring force in such a direction to encourage such angular displacement.

In accordance with the invention, the flap is equipped with a spring member in the same manner as the foregoing, and this spring member is arranged such that when the flap is angularly displaced upwardly past its neutral position, the spring member encourages the angular displacement and causes angular displacement to the upward limiting position. Conversely, when the flap is angularly displaced downwardly past its neutral position, the spring member causes driving of the angular displacement to the downward limiting position. Response can thus be improved through employment of a simple construction.

Furthermore, like the above-described spring provided at the swing arm, this spring is also such that the spring force therefrom causes cancellation of the hinge moment acting on the flap and acts so as to assist the actuators.

Furthermore, in the invention it is preferable that the apparatus comprises a spring actuator intervening between the spring member and the blade, for applying variation of the spring force from the spring member.

The hinge moment acting on the flap varies cyclically with blade rotation and so forth. A spring actuator is provided at the spring member attached to the swing arm or the flap, permitting spring force to be varied by means of this actuator. Accordingly, by using the spring actuator to vary spring force corresponding to the hinge moment acting on the flap, it is possible to assist actuator movement with optimum force.

Furthermore, in the invention it is preferable that the apparatus comprises an input shaft parallel to the axis of the flap angular displacement shaft and fixed to the flap angular displacement shaft eccentrically in a vertical direction. A rod end supports the input shaft so as to permit angular displacement, and connects the connecting rod thereto perpendicularly with respect to the axis of the input shaft.

In accordance with the present invention, input of a displacement from the connecting rod, which undergoes displacement lead and lag direction, to the input shaft, which is fixed eccentrically to the flap angular displacement shaft, causes the displacement of the connecting rod to be magnified, the input arm length being the amount of eccentricity, and causes the flap to undergo angular displacement with a large amplitude. The flap can thus be made to stably undergo magnified displacement through employment of the eccentric input shaft and the rod end which supports the input shaft.

Moreover, in the invention it is preferable that the actuators comprise stack-type piezoelectric actuators in which a plurality of piezoelectric element sheets that undergo displacement in correspondence to a voltage applied thereto are laminated. The sheets are arranged such that a displacement direction thereof is in a blade spanwise direction, and the ends of the actuators at the blade tip side are fixed to the blade.

It is necessary to apply a preload to a stack-type piezoelectric actuator such that it is compressed in the displacement direction during operation. In the invention, however, the actuators are arranged so as to lie along the blade spanwise direction, and the ends of the actuators at the blade tip side are furthermore fixed to the blade. Therefore, the centrifugal force produced during rotation of the rotor blade causes application of a preload on the actuators. As a result, the need to use a spring or the like to apply a preload is eliminated, permitting reduction in the number of components and simplification of the construction.

Furthermore, in the invention it is preferable that the actuators comprise giant magnetostrictive actuators that are displaced as a result of a change in a magnetic field produced by an electric current through an electromagnetic coil. The actuators are arranged such that the displacement direction is in a blade spanwise direction, and one end of each of the actuators at the blade tip side is fixed to the blade.

While it is also necessary to apply a preload to a giant magnetostrictive actuator in the displacement direction, because the actuators are arranged so as to lie along the spanwise direction and because the ends of the actuators at the blade tip side are fixed to the blade, the centrifugal force produced during rotation of the rotor blade causes application of a preload on the actuators. As a result, the need to use a spring or the like to apply a preload is eliminated, permitting reduction in the number of components and simplification of the construction.

BRIEF DESCRIPTION OF THE DRAWINGS

FIG. 4 is a perspective view showing an eccentric shaft 40 of a displacement magnification mechanism 27.

DETAILED DESCRIPTION OF THE INVENTION

Figure 1:
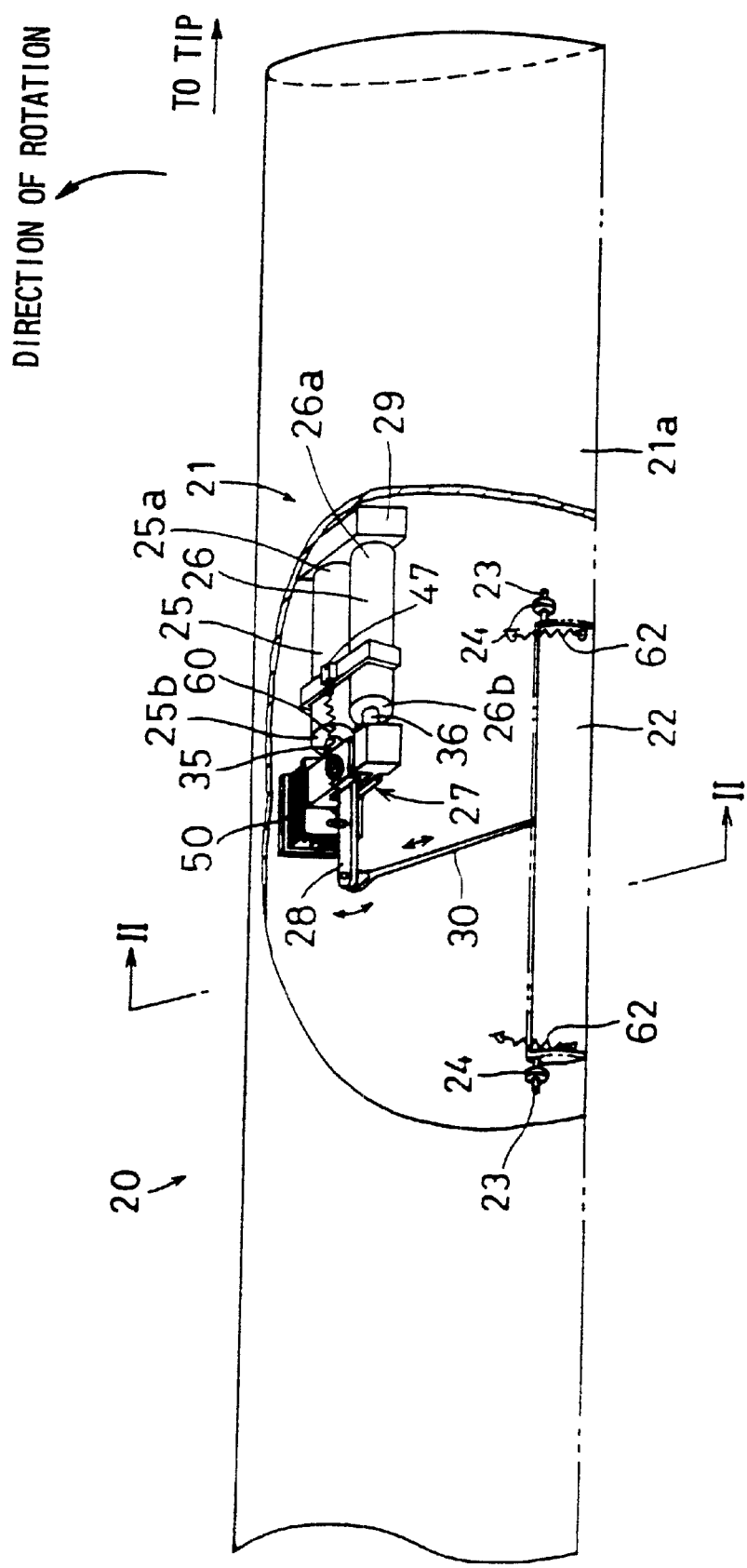
FIG. 1 is a perspective view showing a rotor blade flap drive apparatus 20 of one mode for carrying out the present invention.
Figure 2:
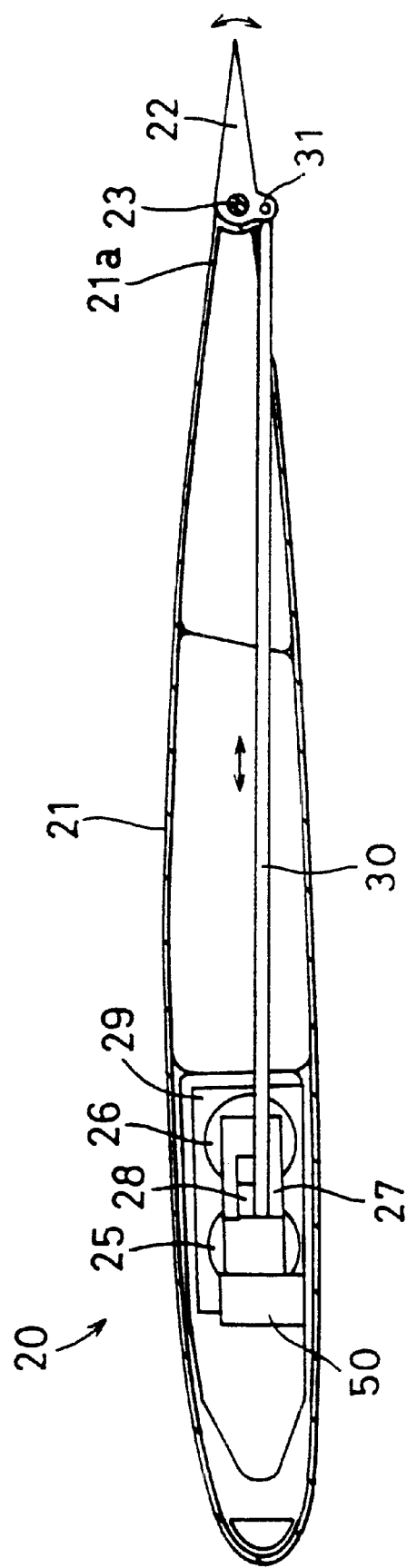
FIG. 2 is a cross-sectional view as viewed from section II—II of FIG. 1.

FIG. 1 is a perspective view showing a portion of a blade 21 cut away in order to show a rotor blade flap drive apparatus 20 of one mode for carrying out the present invention, and FIG. 2 is a cross-sectional view as viewed from section II—II in FIG. 1. The rotor blade is provided on a helicopter, the blade 21 rotating in a counterclockwise direction and the tip thereof being to the right in FIG. 1. The flap drive apparatus 20 comprises a flap 22 and an angular displacement magnification mechanism 27 possessing a swing arm 28 and actuators 25, 26 housed within the blade 21. The flap 22 is attached to a trailing edge 21a of the blade 21 by means of a bearing 24 so as to permit angular displacement about a hinge shaft 23 which lies along the spanwise direction of the blade 21.

The actuators 25, 26 are composed of stack-type piezoelectric actuators formed in the shapes of cylinders in which a plurality of piezoelectric element sheets are laminated in the thickness direction so as to instantaneously undergo strain in the thickness direction and are displaced in accordance with an applied voltage. The actuators are arranged such that the displacement direction of the actuators 25, 26 (being the long direction of the actuators) lies along the spanwise direction of the blade 21. A first end 25a, 26a of each of the actuators 25, 26, near the tip side of the blade 21, are constrained from being displaced relative to the blade 21 by a securing member 29 which is fixed to the blade 21, while displacement of the second end 25b, 26b of each actuator is not so constrained. Accordingly, a preload is applied to the actuators 25, 26 as a result of centrifugal force due to rotation of the rotor blade. This allows a preload to be applied to the actuators 25, 26 without the need to provide the blade with a spring or other such member.

The actuators 25, 26 are arranged such that they are spaced apart from one another in the lead-lag direction (the vertical direction in FIG. 1; the horizontal direction in FIG. 2), and displacement of output portions 35, 36 provided at the second ends 25b, 26b is magnified by the displacement magnification mechanism 27 so that the swing arm 28 swings with large amplitude in the lead-lag direction. A first end of a connecting rod 30 is joined by means of a pin to the tip of the swing arm 28 so as to permit angular displacement, and the second end of the connecting rod 30 is connected to the flap 22, as shown in FIG. 2. Provided at the flap 22 is a projection 31 projecting in a radial direction from the hinge shaft 23, and the second end of the connecting rod 30 is joined by a pin to this projection 31 so as to permit angular displacement. As a result of such construction, the flap 22 undergoes vertical (the vertical direction in FIG. 2) reciprocating angular displacement when the connecting rod 30 is displaced along a lead and lag direction by the swing arm 28. Furthermore, the apparatus may also be constructed such that it is provided with a cover that covers the projection 31 of the flap 22.

Figure 3:
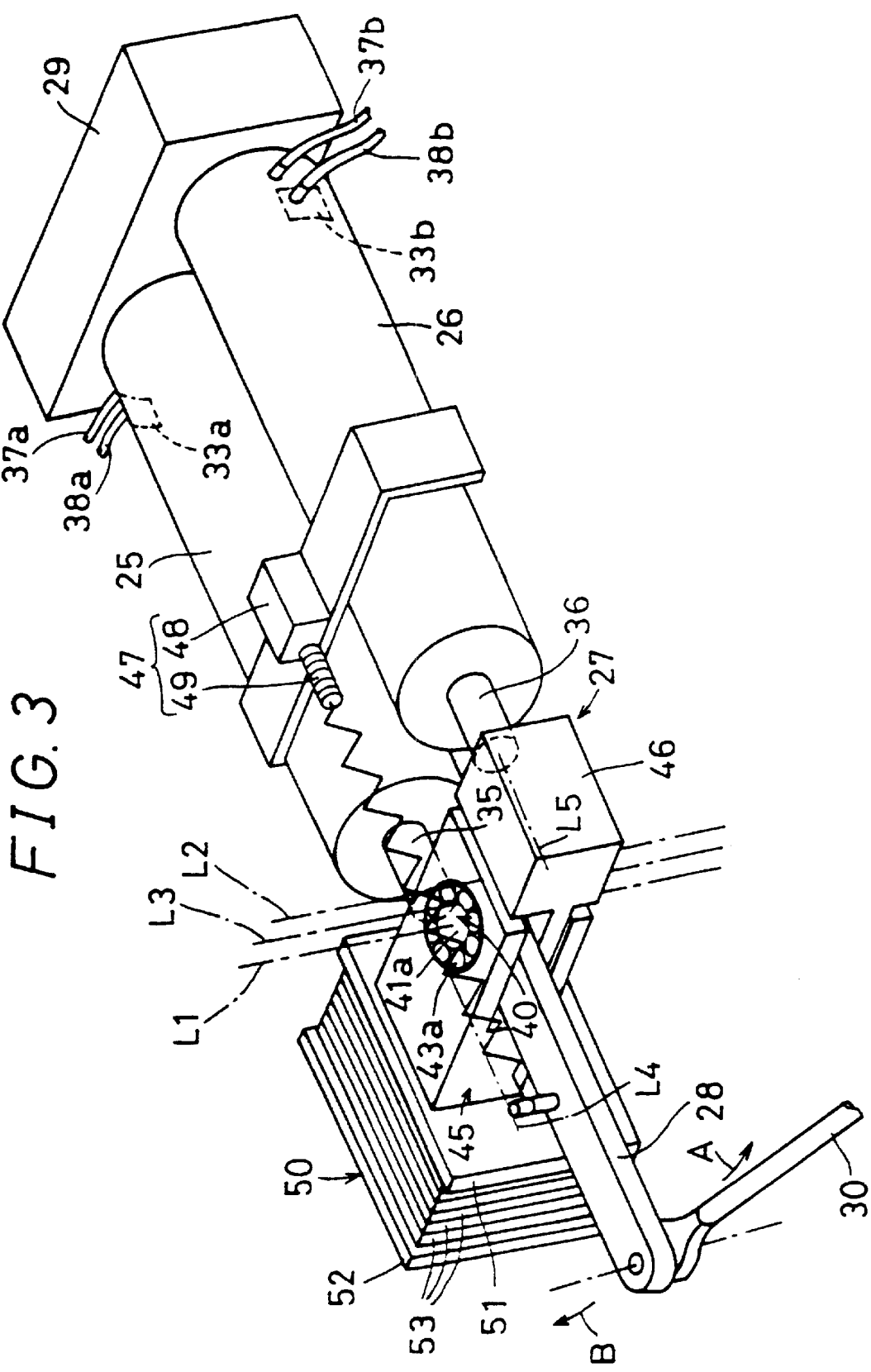
FIG. 3 is a perspective view showing a displacement magnification mechanism 27 and actuators 25, 26.

FIG. 3 is a perspective view showing an enlarged view of the displacement magnification mechanism 27, and FIG. 4 is a perspective view showing a swing arm 28 and eccentric shaft 40 of a displacement magnification mechanism 27. The displacement magnification mechanism 27 includes an eccentric shaft 40 which comprises a mutually eccentric first shaft 41a, 41b and second shaft 42 (i.e., the first shaft and second shaft are offset), and the swing arm 28 is fixed to this eccentric shaft 40. The eccentric shaft 40 consists of the second shaft 42 and first shafts 41a, 41b which are connected in end-to-end fashion above and below the second shaft 42. The first shafts 41a, 41b possess a common first axis L1, while the second shaft 42 possesses a second axis L2, which is eccentric with respect to the first axis L1. The axes of the shafts extend vertically (with respect to FIG. 4) and the first shafts 41a, 41b and the second shaft 42 are respectively connected in end-to-end fashion in the axial direction to from an integral structure. The eccentric shaft 40 may be given an integral construction, for example, as a result of milling, or as a result of respectively forming the first shafts 41a, 41b and second shaft 42 separately and connecting them by means of a bolt.

The first shafts 41a and 41b are respectively supported by first bearings 43a and 43b so as to permit angular displacement, the first bearings 43a and 43b being fixedly supported by a first support 45, which has a c-shaped cross-section, and the output portion 35 of the first actuator 25 is coupled to this first support 45. Fixed to an upper portion (in the axial direction) of the second shaft 42 is a base portion of the swing arm 28, and provided at a lower portion (in the axial direction) of the second shaft 42 is a second bearing 44, which supports the second shaft 42 so as to permit angular displacement. The second bearing 44 is fixedly supported by a second support 46 and the output portion 36 of the second actuator 26 is coupled to this second support 46.

The two actuators 25, 26 respectively extend/contract in the blade spanwise direction with mutually reverse phase (i.e., opposite phases), and the respective output portions 35, 36 are displaced in the spanwise direction with mutually reverse phase. As a result, the first support 45, which is coupled to one output portion 35, and the second support 46, which is coupled to the other output portion 36, are alternately displaced in opposite directions. When for example, the first actuator 25 is extended and the second actuator 26 contracts, the swing arm 28 undergoes angular displacement in the direction of arrow A (lag direction). When the first actuator 25 contracts and the second actuator 26 is extended, the swing arm 28 undergoes angular displacement in the direction of arrow B (lead direction). At this time, taking the center between axis L1 of the first shaft 41 and the axis L2 of the second shaft 42 to be an imaginary central axis of swing L3, the eccentric shaft 40 and the swing arm 28 undergo angular displacement about this imaginary central axis of swing L3. Now, the respective output portions 35, 36 are displaced in mutually reverse (opposite) phase, but even if they are not exactly reverse in phase but are in slight disagreement with their respective nominally reverse phase values, this will only result in a slight linear displacement of the imaginary central axis of swing L3, permitting automatic adjustment of stable swing of the swing arm 28 in the lead-lag directions. The swing arm 28 can thus be made to swing stably through employment of a simple construction.

The first end of the connecting rod 30 is connected by a pin to the tip of the swing arm 28 so as to permit angular displacement. Taking the distance between this connecting point and imaginary central axis of swing L3 to be C, and taking the distance between the imaginary central axis of swing L3 and the first axis L1 or second axis L2 to be D, the displacement magnification factor of the displacement magnification mechanism 27 is C/D.

Furthermore, the first support 45 is provided with linear guide means 50, as a result of which the output portion 35 of the first actuator 25 arranged nearer to the leading edge of the blade is guided so as to move in proper linear fashion. The linear guide means 50 is implemented in this mode for carrying out the invention through use of an elastomeric bearing. The elastomeric bearing consists of a stacked plurality of sheets of elastomer 53 with steel separation plates capable of elastic deformation in the shearing direction and supported in straddling fashion from both sides in the thickness direction by a pair of stiff support plates 51, 52, preventing displacement in the thickness direction but allowing displacement in a direction perpendicular to the thickness direction (shearing direction). The first support plate 51 of the linear guide means 50 is coupled with the first support 45 at the leading edge side of support 45, and the second support plate 52 is fixed to blade 21. The reactive force from the flap 22 is received by the linear guide means 50, so that the first support 45 and the output portion 35 of first actuator 25 are guided so as to move in a proper linear fashion, allowing the swing arm 28 to swing stably and reliably. The eccentric shaft 40 swings about the imaginary central axis of swing L3, causing the first shaft 41 and second shaft 42 to be displaced in opposite directions in more or less mutually parallel fashion. Because the distance between the first axis L1 and second axis L2 is constant, the paths of motion described by the first axis L1 and second axis L2 when the eccentric shaft 40 swings will not be exactly parallel, the paths of motion instead being slightly curved such that the distance between the first axis L1 and second axis L2 is largest in the vicinity of the imaginary central axis of swing L3. Because in the present mode for carrying out the invention the path of motion of the first shaft 41 is set so as to be linear by the linear guide means 50, only the path of motion of the second axis L2 will be curved. In order to allow such a path of motion, a construction is adopted wherein linear guide means is not provided at the second support 46 side. Moreover, the invention is not limited to constructions wherein the linear guide means 50 is provided at the side of the first actuator 25, and an arrangement in which the linear guide means is provided only at the side of the second actuator 26 is also possible.

Driving power is fed to the respective actuators 25, 26 by way of respective power cables 37a, 37b. Moreover, stroke sensors 33a, 33b are incorporated within the respective actuators 25, 26, and output from these stroke sensors 33a, 33b is fed by way of sensor output cables 38a, 38b.

Taking the axis of displacement of the output portion 35 of the first actuator 25 to be L4, and taking the axis of displacement of the output portion 36 of the second actuator 26 to be L5, in the present mode for carrying out the invention a construction has been adopted which is such that the displacement axis L4 and the first axis L1, and the displacement axis L5 and the second axis L2, do not intersect. However, a construction which is such that the displacement axis L4 and the first axis L1, and the displacement axis L5 and the second axis L2, do intersect may also be adopted as another mode for carrying out the present invention. As a result of adoption of such a construction, the driving force from the output portion 35 of the first actuator 25 can be made to act on the center of the first shaft 41a, 41b, and the driving force from the output portion 36 of the second actuator 26 can likewise be made to act on the center of the second shaft 42, permitting efficient transmission of the driving forces of the actuators 25, 26 to the swing arm 28.

Figure 5A:
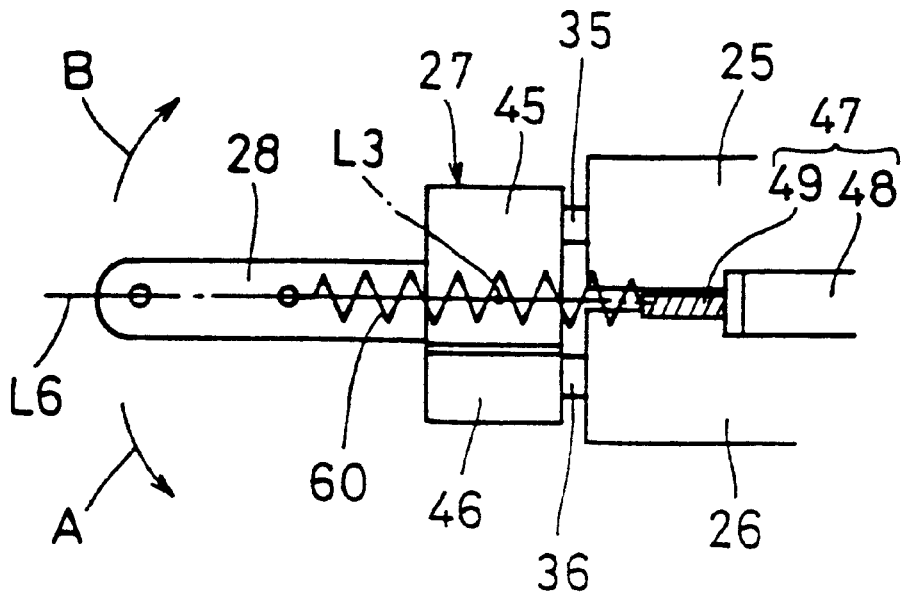
FIG. 5A and FIG. 5B are plan views showing an arm spring member 60 provided at a displacement magnification mechanism 27.
Figure 5B:
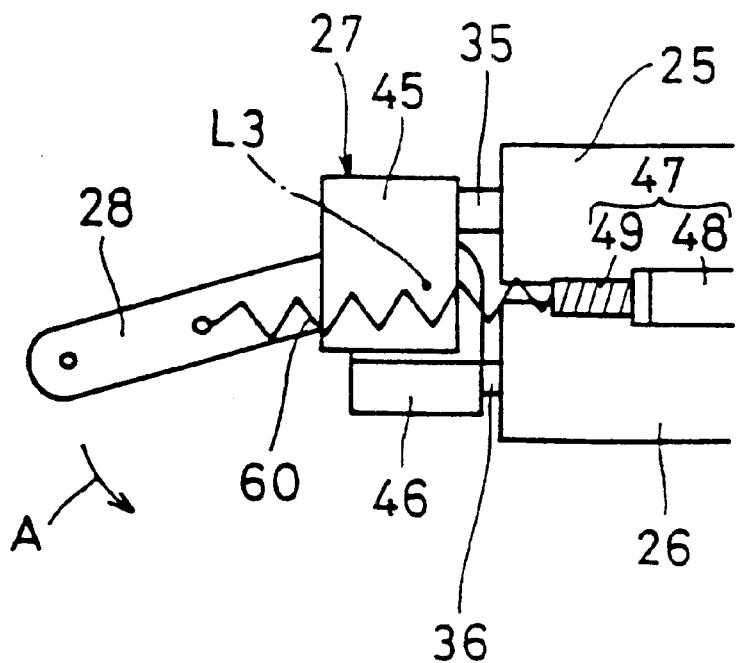

FIG. 5A and FIG. 5B are plan views of the displacement magnification mechanism 27. Provided at the displacement magnification mechanism 27 are a spring actuator 47 and an arm spring member 60 to improve the response of the swing arm 28. A first end of the arm spring member 60 is coupled to the swing arm 28, while the second end thereof is attached to the blade 21 by way of the spring actuator 47, which is a linear actuator consisting of a ballscrew 49 and an electric motor 48. When the swing arm 28 is in a predefined neutral position L6, the arm spring member 60 exerts a spring tensile force through the imaginary central axis of swing L3 and in the longitudinal direction of the swing arm 28. The spring member 60 is, for example, a helical tension spring, and no spring force is exerted in either the lead or lag direction, these representing the direction of swing, when the swing arm 28 is in the neutral position L6. However, when the swing arm 28 is angularly displaced to the lag direction from the neutral position L6 (in the direction of arrow A), the spring force of the spring member 60 promotes lag-wise angular displacement, resulting in rapid angular displacement of the swing aim 28 to the lag-wise full-stroke position, as shown in FIG. 5B.

Conversely, when the swing arm 28 is angularly displaced past the neutral position L6 and lead-direction as indicated by arrow B, the spring tensile force of the spring member 60 causes rapid angular displacement to the lead-wise full-stroke position. Accordingly, by causing lead-lag swing of the swing arm 28 about its neutral position through use of the actuators 25, 26, it is possible to drive the swing arm 28 such that it undergoes rapid angular displacement to its full-stroke position, permitting improvement in response.

Furthermore, this spring force acts so as to cancel the hinge moment acting on the flap 22 and so as to assist driving of the flap by the actuators 25, 26.

Figure 6:
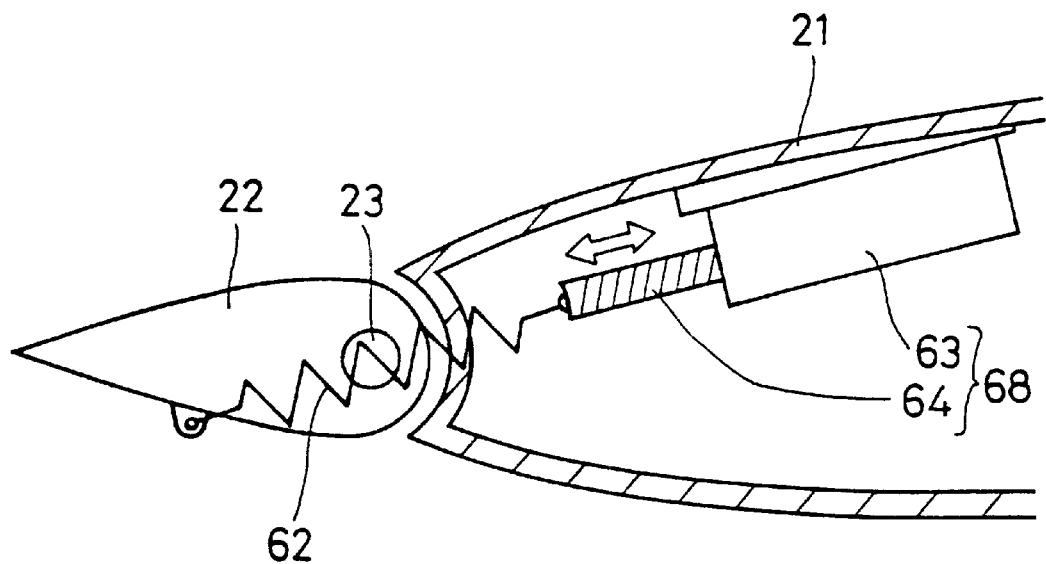
FIG. 6 is a front view of a flap spring member 62 provided at a flap 22.

FIG. 6 is a schematic view showing a flap spring member 62 provided on a flap 22. The flap 22 is also equipped with the spring member 62 possessing a function similar to that of the arm spring member 60, with which the above-described displacement magnification mechanism 27 is equipped. As shown in FIG. 6, a first end of the flap spring member 62 is coupled to the flap 22, while the second end thereof is coupled to the blade 21 by way of a spring actuator 68, which is a linear actuator consisting of an electric motor 63 and a ballscrew 64. As shown in FIG. 6, when the flap 22 is in its neutral position, the spring member 62 exerts a spring force in a direction passing through the hinge shaft 23, and no angular displacement force is exerted either upwardly or downwardly on the flap 22. Angular displacement of the flap 22 upwardly past its neutral position causes the flap 22 to be angularly displaced toward the upward limiting position as a result of the spring force from the spring member 62. Conversely, angular displacement of the flap 22 downwardly past its neutral position causes the flap 22 to be angularly displaced toward the downward limiting position as a result of the spring force from the spring member 62. The spring member 62 makes it possible for the flap 22 to be rapidly and stably angularly displaced to its fall-stroke position, and for response to be improved.

Furthermore, like the above-described spring 60 provided at the swing arm 28, this spring 62 is also arranged such that the spring force therefrom causes cancellation of the hinge moment acting on the flap 22 and acts so as to assist driving of the flap 22 by the actuators 25, 26.

Because the flap 22 is attached to the helicopter blade 21 which rotates, airspeed will be different when the blade is on the helicopter advancing side and when it is on the helicopter retreating side, as a result of which the hinge moment acting on the flap 22 will vary cyclically. Furthermore, hinge moment is also affected by pilot control settings. In order to avoid the effects of such fluctuations in hinge moment, the respective spring members 60, 62 are respectively provided with the spring actuators 47, 68. That is, these spring actuators 47, 68 are made to extend and contract in cyclical fashion, causing the spring force of the spring members 60, 62 to fluctuate so as to cancel the cyclically fluctuating hinge moment. This makes it possible to assist the movement of the actuators 25, 26 with optimal force.

Figure 7:
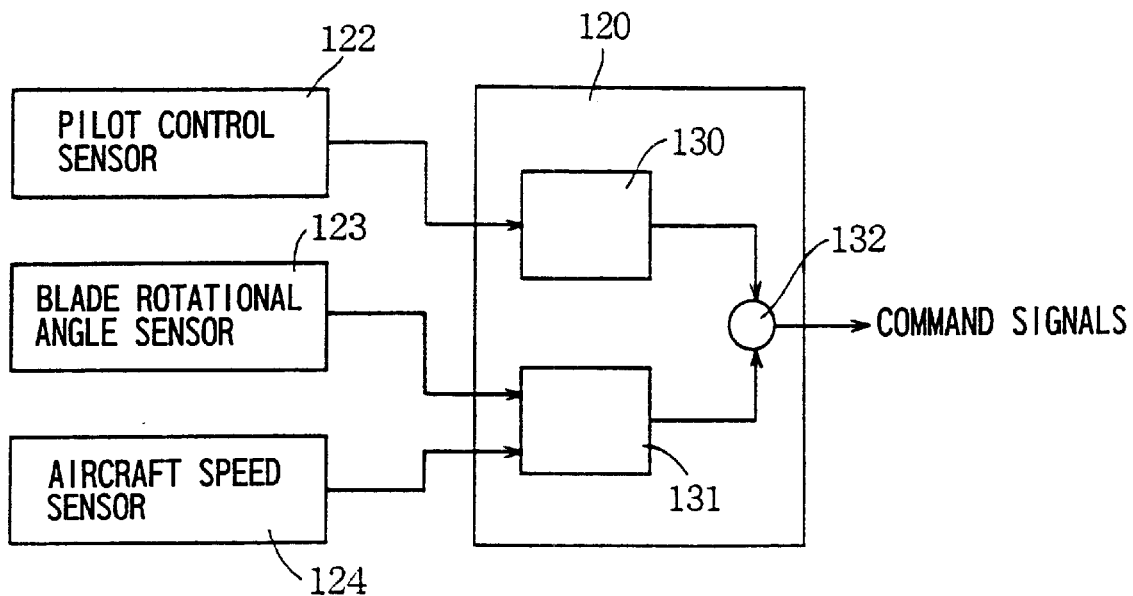
FIG. 7 is a block view of a motor controller 120.
Figure 8:
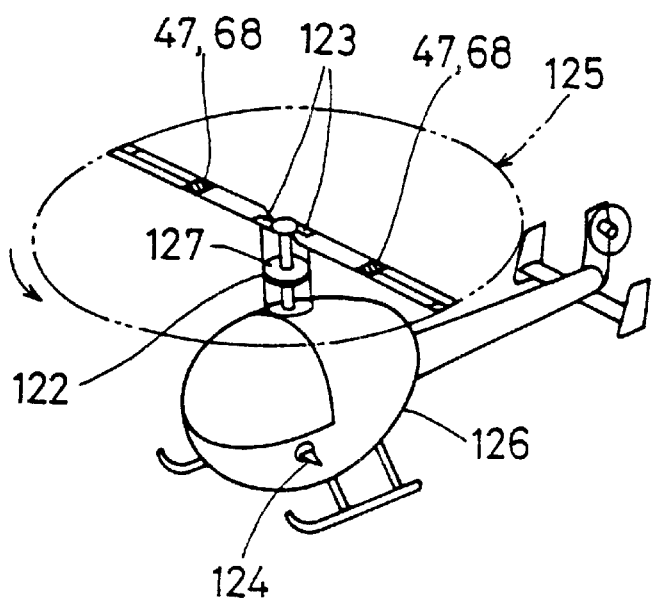
FIG. 8 is a drawing showing several sensors 122 through 124 provided at a fuselage 126.

FIG. 7 is a block diagram showing the construction of a motor controller 120 for the electric motors 48, 63 which drive linear actuators 47, 68, and FIG. 8 is a drawing showing several types of sensors 122 through 124 in a helicopter. Each blade 21 of a rotor 125 is respectively provided with a blade rotational angle sensor 123. Furthermore, a fuselage 126 is provided with the aircraft speed sensor 124 for detecting airspeed. Furthermore, pilot control settings are detected by the pilot control sensor 122, which is attached to a swash plate 127.

The motor controller 120 provides output command signals that drive the respective motors 48, 63 of the respective spring actuators 47, 68 based on the pilot control sensor 122, the blade rotational angle sensor 123, and the aircraft speed sensor 124. The motor controller 120 possesses a first computational circuit 130, a second computational circuit 131, and a third computational circuit 132. At the first computational circuit 130, the period and amplitude of cyclical fluctuations in hinge moment produced as a result of cyclic and collective pitch control are calculated based on the pilot control sensor 122, while at the second computational circuit 131 the period and amplitude of cyclical fluctuations in hinge moment produced as a result of the difference in airspeed at the advancing side and retreating side due to rotation of the blade 21 are calculated based on the blade rotational angle sensor 123 and the aircraft speed sensor 124. The third computational circuit 132 calculates and provides command signals to the motors 48, 63 which, for example, cause cancellation of fluctuations in hinge moment produced as a result of pilot control settings and blade rotation. The respective motors 48, 63 are controlled, based on computational results from these first and second computational circuits 130, 131. As a result, the respective ballscrews 49, 64 rotate, the respective spring actuators 47, 68 extend and contract in cyclical fashion, and spring forces from the spring members 60, 62 balance cyclical fluctuations in hinge moment, canceling such fluctuation. The respective spring members 60, 62, which are attached to the flap 22 and the swing arm 28, thus assist the movements of the actuators 25 and 26 with a constantly optimum force. Moreover, the first through third computational circuits 130 through 132 are respectively provided in multiple sets as numerous as the number of respective motors, and processing is carried out in parallel.

Figure 9:
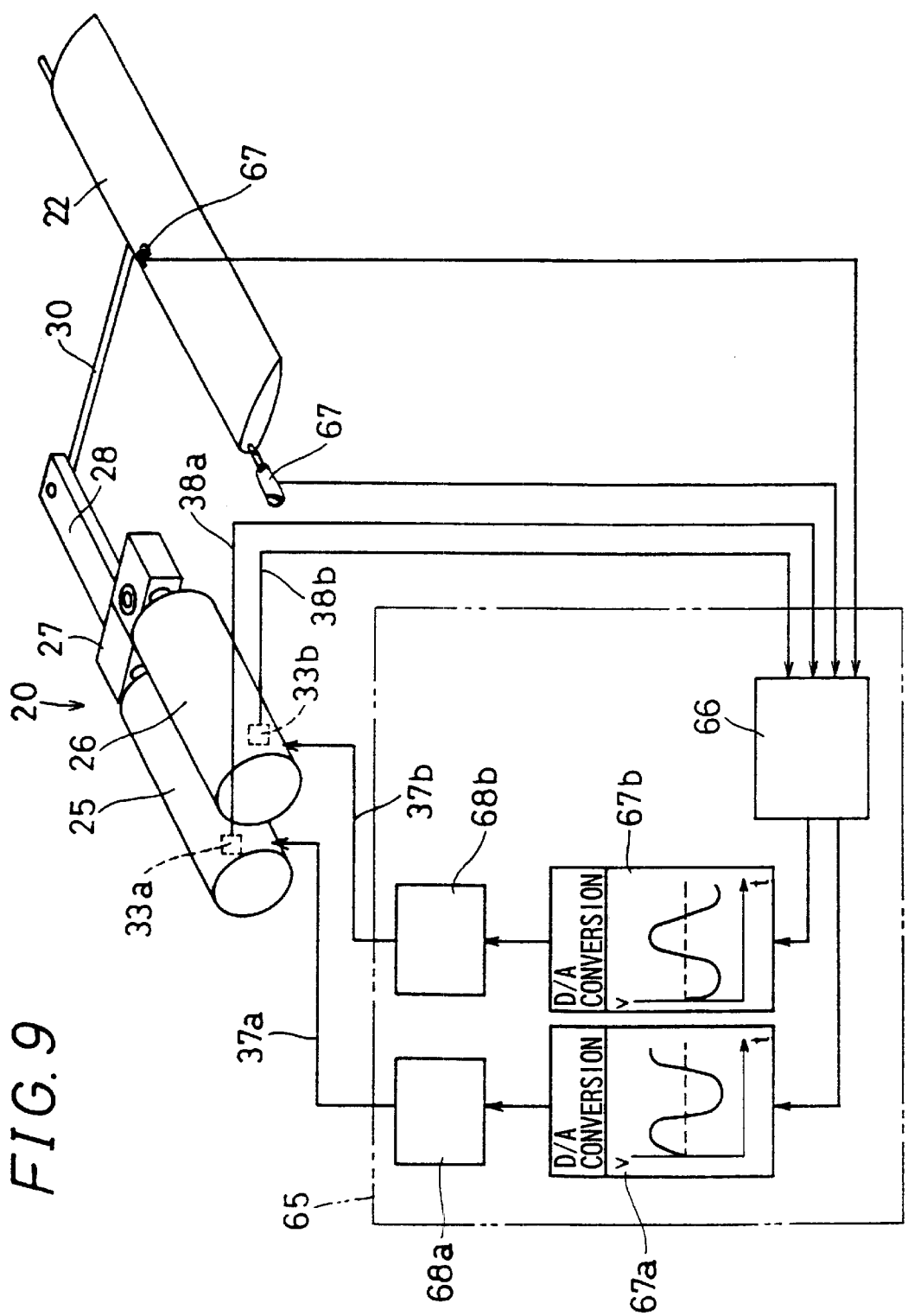
FIG. 9 is a drawing showing a method for controlling a flap drive apparatus 20.

FIG. 9 is a drawing showing a method for controlling a flap drive apparatus 20. At a signal processing circuit 66 of control means 65 in the flap drive apparatus 20, command signals are generated for the respective actuators 25, 26 which are mutually reverse (opposite) in phase based on target signals representing target angular displacement frequency, amplitude, and neutral angular displacement position for the flap. D/A conversion is carried out at D/A converters 67a, 67b, voltage is amplified at voltage amplifiers 68a, 68b, and the amplified voltages are fed to the respective actuators 25, 26 by way of the power cables 37a, 37b. The stroke sensors 33a, 33b are incorporated in the respective actuators 25, 26, output stroke of the actuators 25, 26 being fed back to the signal processing circuit 66 by way of the sensor output cables 38a, 38b. In addition, a flap angle sensor 67 is attached to the flap 22, and the angular displacement of the flap 22 is fed back to the signal processing circuit 66. At the signal processing circuit 66, command signals are controlled so as to cause the flap 22 to carry out reciprocating angular displacement at the target amplitude and frequency about a predefined central angular displacement position as center based on target signals and feedback signals from the stroke sensors 33a, 33b and the flap angle sensor 67. As a result of carrying out feedback control in such fashion, it is possible to control the flap 22 with high precision.

Figure 10A:
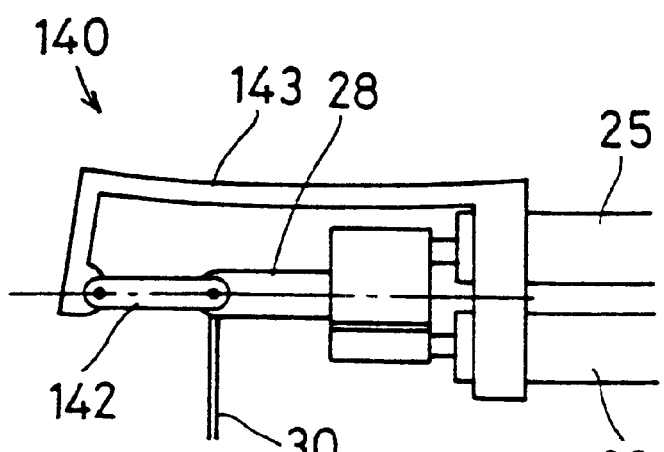
FIG. 10A and FIG. 10B are plan views showing an elastic support member 143 provided at a displacement magnification mechanism 140 of a flap drive apparatus of another mode for carrying out the present invention.
Figure 10B:
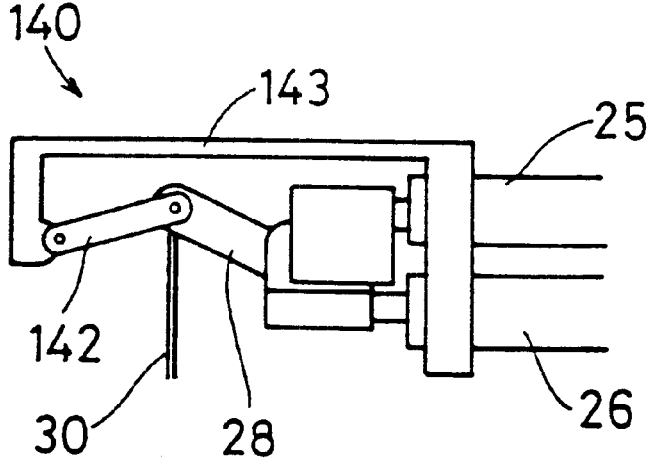

FIG. 10A and FIG. 10B are plan views showing a displacement magnification mechanism 140 of a flap drive apparatus in another mode for carrying out the present invention. The displacement magnification mechanism 140 is analogous to the displacement magnification mechanism 27 shown in FIGS. 5A and 5B, and corresponding structures have been given identical reference symbols and a description thereof shall be omitted. At the displacement magnification mechanism 27 of the first embodiment, the arm spring member 60 comprising a helical tension spring was provided in order to improve the response of the swing arm 28. However, at the displacement magnification mechanism 140 in the present embodiment, an elastic support member 143 which exerts a spring force in a compressive direction with respect to the swing aim 28 is provided. The elastic support member 143 intervenes between the swing arm 28 and the blade 21, the tip thereof being coupled to the swing arm 28 by way of a link member 142, and the base portion thereof being attached to the blade 21 by way of the actuators 25, 26. A first end of the link member 142 is attached to the tip of the swing arm 28 so as to permit angular displacement, while the second end is attached to the tip of the elastic support member 143 so as to permit angular displacement. The base portion of the elastic support member 143 is attached to the actuators 25, 26, and elastic deformation causes constant exertion of a compressive force on the link member 142 and the swing arm 28. As shown in FIG. 10A, with the link member 142 and swing arm 28 lying along a straight line, the elastic restoring force of the elastic support member 143 causes the greatest compressive force to be exerted on the link member 142 and the swing arm 28, but no force is exerted at this time on the swing arm 28 in either lead or lag direction, these representing the direction of swing. When the swing arm is angularly displaced in either the lead or lag direction past its neutral position, the compressive force on the link member 142 and swing arm 28, imparted thereto due to the elastic restoring force of the elastic support member 143, causes encouragement of angular displacement of the swing arm 28. As shown in FIG. 10B, the swing arm 28 undergoes rapid angular displacement to its full-stroke position. Accordingly, by causing lead-lag swing of the swing arm 28 about its neutral position as center through the use of the actuators 25, 26, it is possible to rapidly drive angular displacement of the swing arm 28 to its full-stroke position and to improve response.

Figure 11:
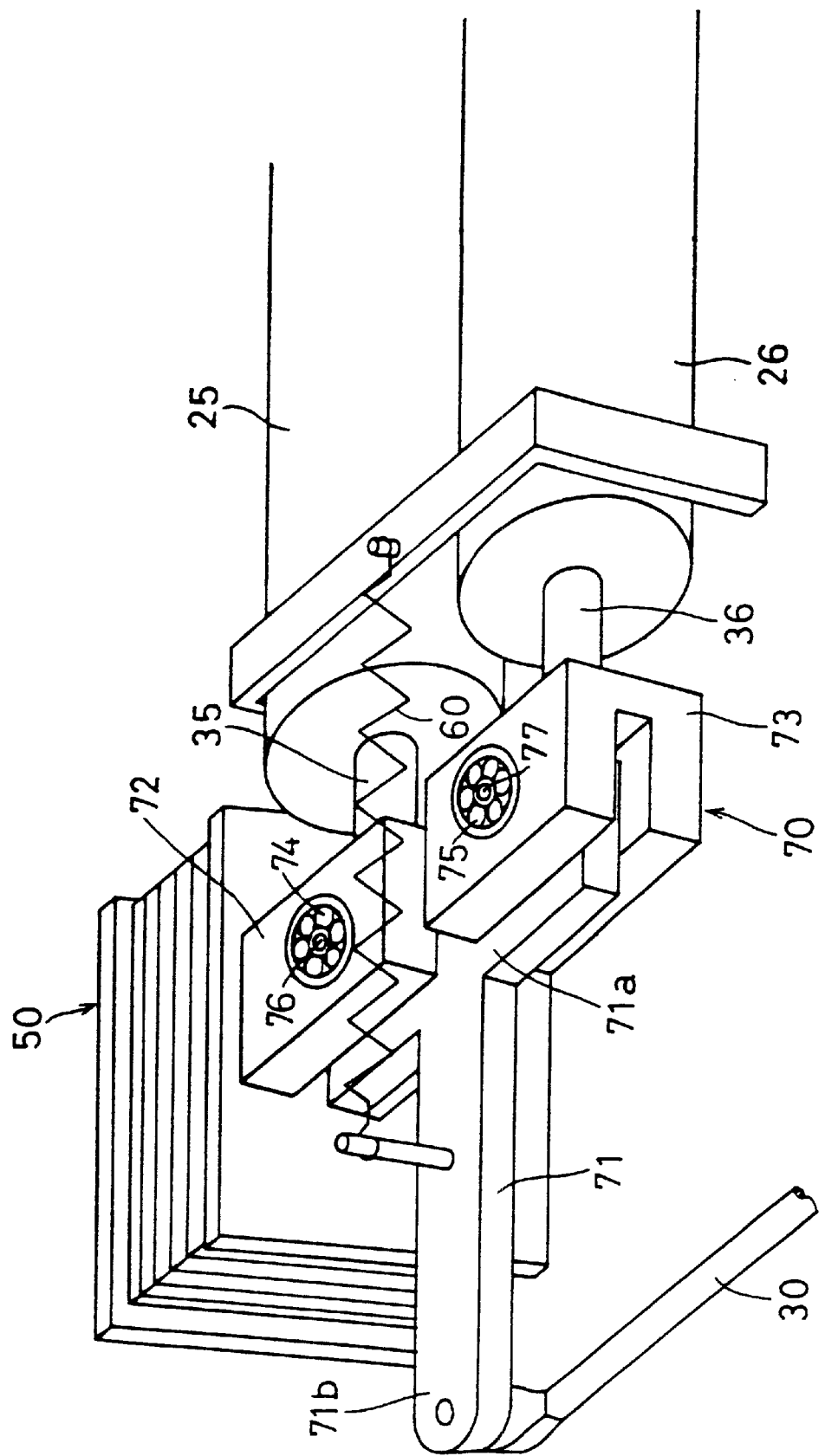
FIG. 11 is a perspective view showing a displacement magnification mechanism 70 of a flap drive apparatus of another mode for carrying out the present invention.

FIG. 11 is a perspective view showing a displacement magnification mechanism 70 of a flap drive apparatus in another embodiment of the present invention. The present embodiment of the invention is analogous to the flap drive apparatus 20 shown in FIG. 1 through FIG. 9, and corresponding structures have been given identical reference symbols and description thereof shall be omitted.

The displacement magnification mechanism 70 possesses a T-shaped swing arm 71, and the output portions 35, 36 of the respective actuators 25, 26 are coupled to a base portion 71a side thereof and the connecting rod 30 is connected to a tip 71b thereof. A first supporting member 72, which has a roughly c-shaped cross-section, is coupled to the output portion 35 of the actuator 25, which is arranged at the lead-wise side, and a first angular displacement shaft 76, which extends vertically, is provided at the lead-wise side of the base portion 71a of the swing arm 71. This first angular displacement shaft 76 is supported by the first supporting member 72 by way of a bearing 74 so as to permit angular displacement. In like manner, a second supporting member 73, which has a roughly c-shaped cross-section, is coupled to the output portion 36 of the actuator 26, which is arranged at the lag-wise side, and a second angular displacement shaft 77, which extends vertically, is provided at the lag-wise side of the base portion 71a of the swing arm 71. This second angular displacement shaft 77 is supported by the second supporting member 73 by way of a bearing 75 so as to permit angular displacement.

Accordingly, causing displacement of the output portions 35, 36 such that the respective actuators 25, 26 are in mutually reverse (opposite) phase causes the tip of the swing arm 71 to stably swing in lead and lag directions about an imaginary central axis of swing located centrally between the axis of the first shaft 76 and the axis of the second shaft 77.

Figure 12:
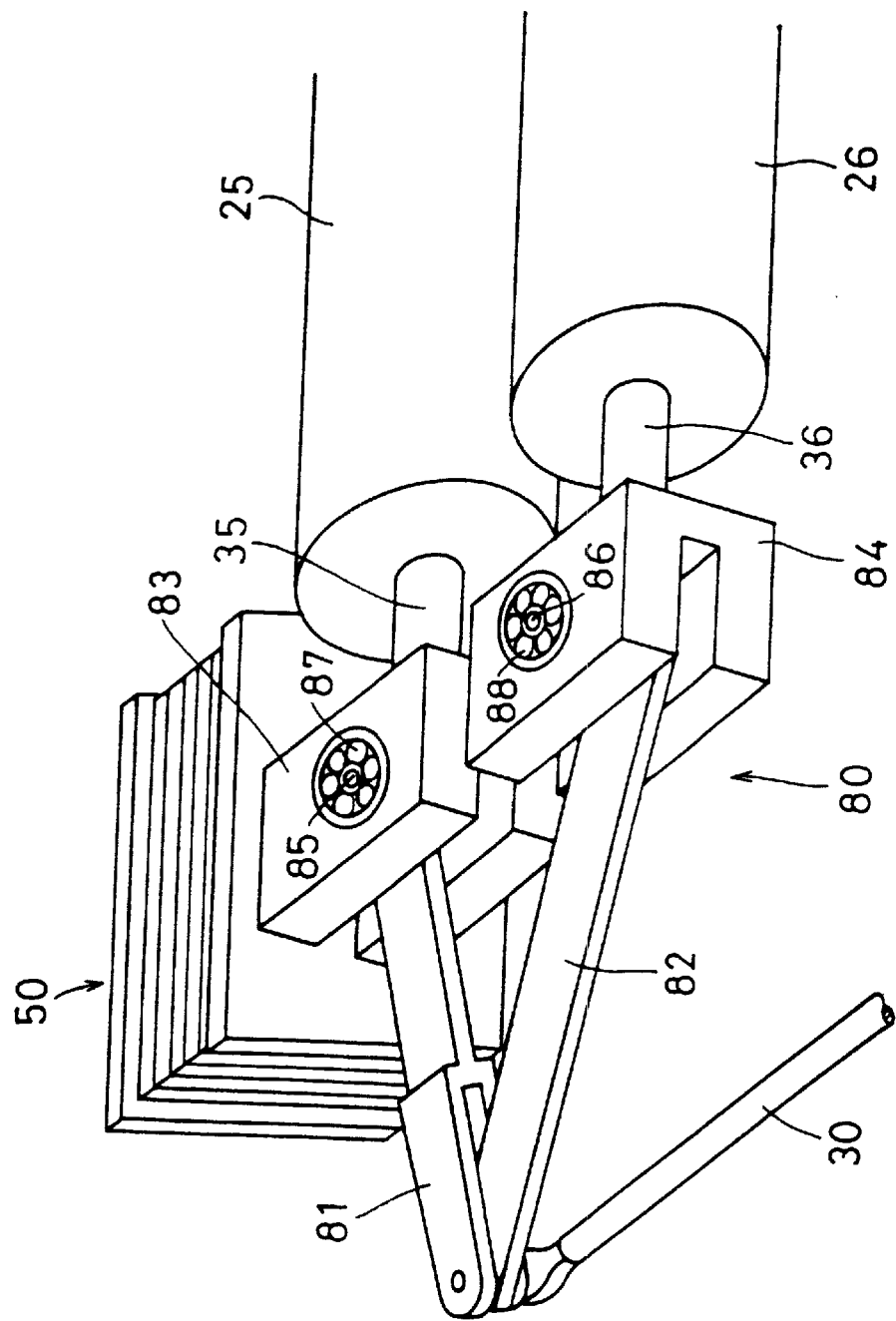
FIG. 12 is a perspective view showing a displacement magnification mechanism 80 in a flap drive apparatus of another mode for carrying out the present invention.

FIG. 12 is a perspective view showing a displacement magnification mechanism 80 in a flap drive apparatus of another embodiment of the present invention. The present embodiment of the invention is analogous to the flap drive apparatus 20 shown in FIG. 1 through FIG. 9, and corresponding structures have been given identical reference symbols and description thereof shall be omitted.

The swing arm of the displacement magnification mechanism 80 is constructed in toggle-link fashion. from two links 81 and 82. The supporting member 83, which has a roughly c-shaped cross-section, is attached to the output shaft 35 of the first actuator 25 which is arranged at the lead-wise side, and a supporting member 84, which has a roughly c-shaped cross-section, is likewise attached to the output portion 36 of the second actuator 26 which is arranged at the lag-wise side. A first shaft 85, which extends vertically, is provided at the base portion of the first link 81 of the two links 81, 82, and this first shaft 85 is supported so as to permit angular displacement by a pair of first bearings 87 provided above and below the one supporting member 83 of the supporting members 83, 84. In a like manner, a second shaft 86 provided at the base portion of the second link 82 is supported so as to permit angular displacement by a pair of second bearings 88 for the other of the supporting members 84. Furthermore, the other end of the first link 81 is bifurcated in a Y-shaped fashion (i.e., "forked") and is coupled to and straddles the tip of the second link 82, so as to permit mutual angular displacement, and this tip is further connected by one end of the connecting rod 30 so as to permit angular displacement. As a result of such construction, driving the respective output portions 35, 36 of the actuators 25, 26 such that they are displaced in mutually reverse phase causes the tips of the links 81, 82 to stably swing in lead and lag direction about an imaginary central axis of swing located centrally between the first shaft 85 and second shaft 86, and this permits the flap to be stably driven vertically in reciprocating angular displacement fashion.

Figure 13:
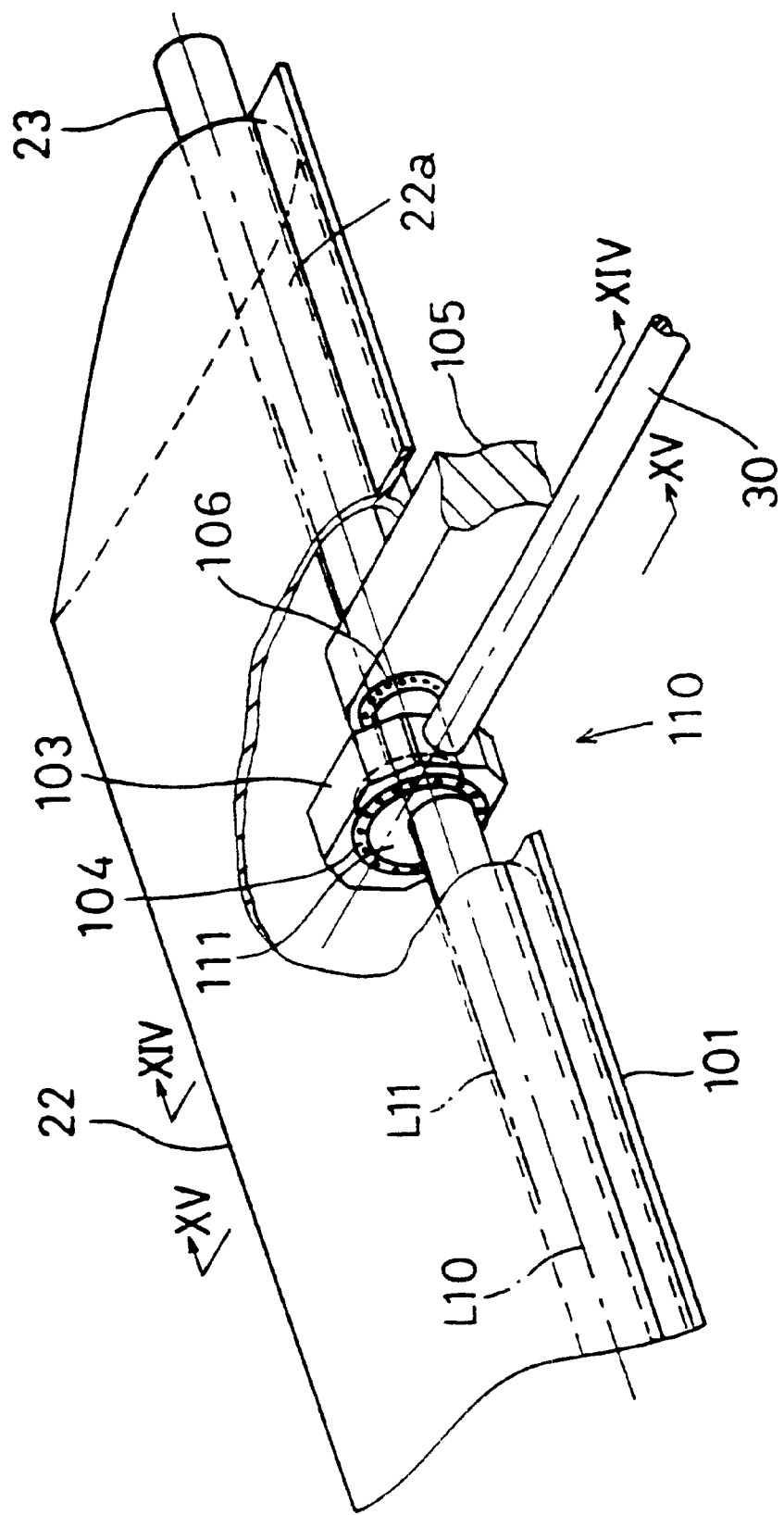
FIG. 13 is a perspective view showing a second displacement magnification mechanism 110 in a flap drive apparatus of another mode for carrying out the present invention.
Figure 14:
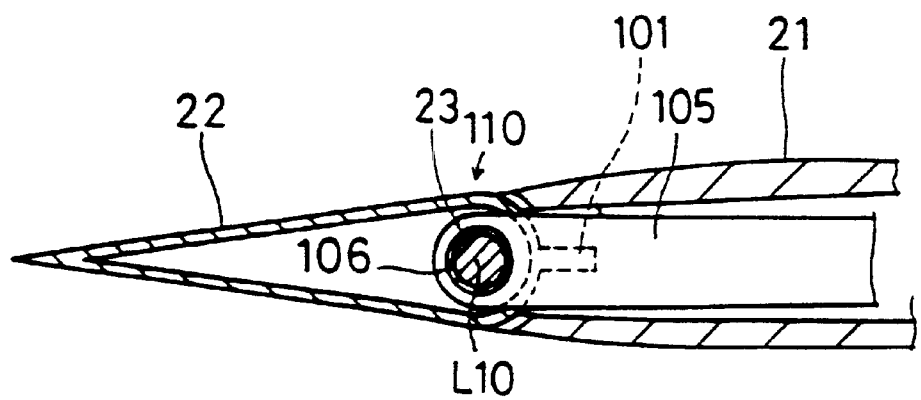
FIG. 14 is a cross-sectional view as viewed from section XIV—XIV of FIG. 13.
Figure 15:
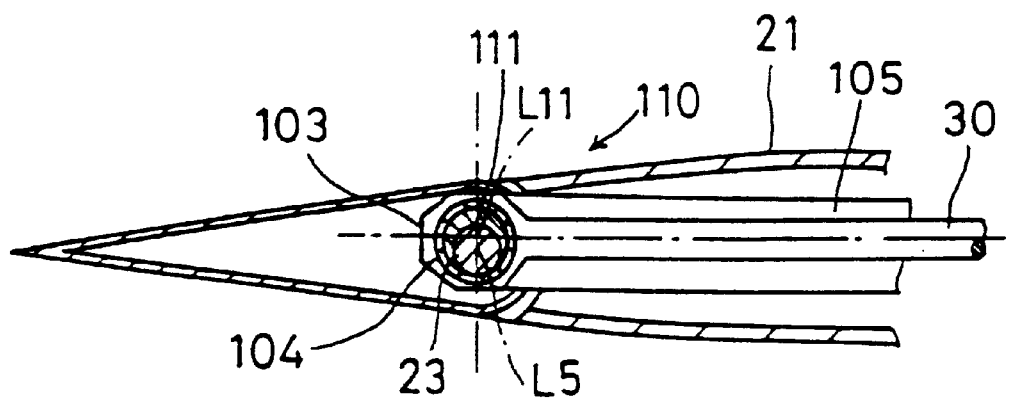
FIG. 15 is a cross-sectional view as viewed from section XV—XV of FIG. 13.
Figure 16:
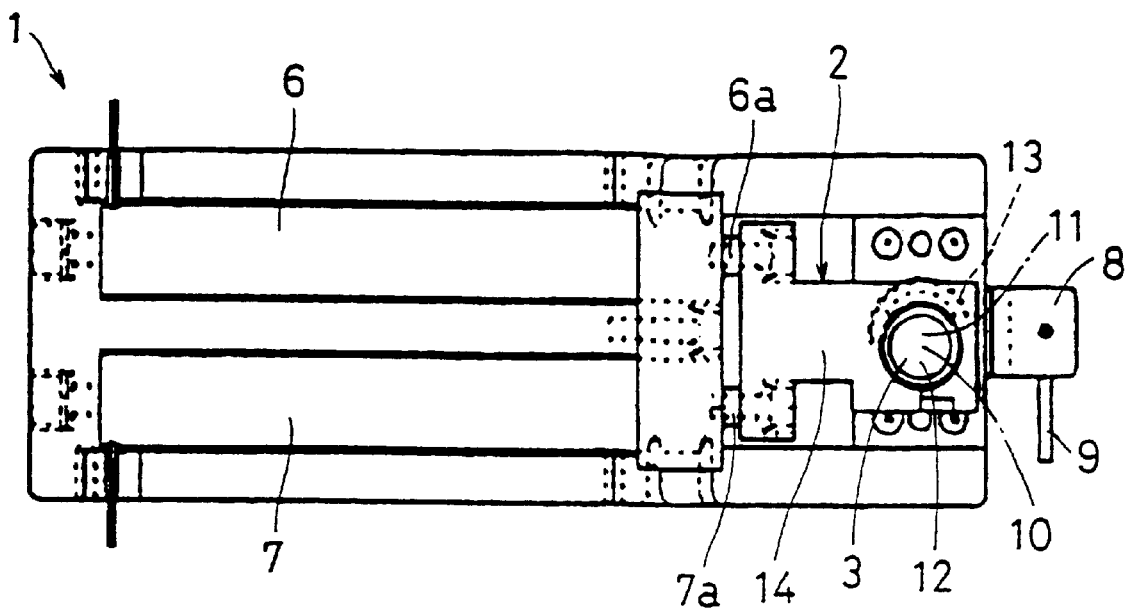
FIG. 16 is a plan view of a conventional rotor blade flap drive apparatus 1.
Figure 17:
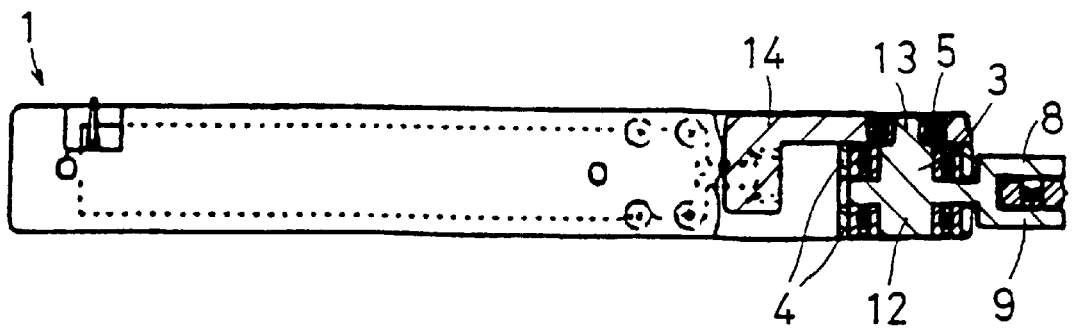
FIG. 17 is a side view of rotor blade flap drive apparatus 1.

FIG. 13 is a perspective view showing a rotor blade flap drive apparatus 110 of yet another embodiment of the present invention, with the flap 22 partially cut away. FIG. 14 is a cross-sectional view as viewed from section XIV—XIV of FIG. 13; and FIG. 15 is a cross-sectional view as viewed from section XV–XV of FIG. 13. The present embodiment of the invention is analogous to the rotor blade flap drive apparatus 20 shown in FIG. 1 through FIG. 9, and corresponding structures have been given identical reference symbols. Furthermore, the displacement magnification mechanism attached directly to the actuators may be the displacement magnification mechanism 27, 110 employing the eccentric shaft 40 such as is shown in FIG. 1 through FIG. 10, or may be the displacement magnification mechanism 70 employing the T-shaped swing arm 71 shown in FIG. 11, or may be the displacement magnification mechanism 80 employing the toggle-link-type swing arm shown in FIG. 12.

As shown in FIG. 13, a flat plate 101 is formed at a leading edge 22a of the flap 22 such that it protrudes forward therefrom and extends in a spanwise direction. This flat plate 101 serves as mass balance, shifting the overall mass balance of the flap 22 to the vicinity of the hinge shaft 23 or forward thereof, serves as an air seal for preventing undesirable flow of air between the top and bottom surfaces of the blade 21 at the flap leading edge 22a, and serves as a stopper for contacting the blade 21 and preventing angular displacement in the event of a large angular displacement of the flap 22 by a force from the airload.

At the above-described rotor blade flap drive apparatus 20, displacement of the connecting rod 30, as shown in FIG. 2, is connected to the projection 31 projecting in a radial direction from the hinge shaft 23 of the flap 22 as center, and causes angular displacement of the flap 22.

In contrast thereto, in the present mode for carrying out the invention, the second displacement magnification mechanism 10 is provided at the hinge shaft 23 (i.e., flap angular displacement shaft) of the flap 22. The second displacement magnification mechanism 110 possesses an input shaft 111, a bearing 104, and a rod end 103. As shown in FIG. 13 and FIG. 15, the input shaft 111 is fixed eccentrically in integral fashion to the hinge shaft 23 of the flap 22. This input shaft 111 is a large-diameter shaft, its diameter being larger than that of the hinge shaft 23, and possesses an axis L11 that is eccentric with respect to (i.e., offset a fixed distance from) a flap angular displacement axis L10. The rod end 103 possesses the bearing 104, which supports the input shaft 111 so as to permit angular displacement about its axis L11, and the connecting rod 30 is coupled by way of this rod end 103 so as to perpendicularly intersect the axis L11.

Furthermore, in order to prevent a decrease in displacement due to flexure of the hinge shaft 23, a support member 105 is provided, one end of which is fixed to the trailing edge side of the blade 21 and the other end of which supports the hinge shaft 23, by way of a bearing 106, at a location in the vicinity of the input shaft 111 so as to permit rotation, propping up and supporting the hinge shaft 23. This support member 105 may be provided at both sides of the input shaft 111, or may be provided at one side only.

As shown in FIG. 2, such a construction permits reduction in the distance between the axis L10 of the hinge shaft 23 and the axis L11 of the input shaft 111, as compared with-a construction wherein the connecting rod 30 is attached to the projection 31. Because the distance between the axis L10 and the axis L11 represents input arm length and this input arm length can be made extremely small, this causes the distance from the axis L11 to the trailing edge of the flap 22 to be larger than the distance between the axis L11 and the axis L11, making it possible to increase the magnification factor of the second displacement magnification mechanism 110.

Furthermore, because the rod end 103 is housed within the interior of the flap 22, the portion projecting outside the blade is eliminated, improving aerodynamic characteristics.

Furthermore, the actuators 25, 26 are not limited to stack-type piezoelectric actuators, but may be giant magnetostrictive actuators, or another type of actuator.

A giant magnetostrictive actuator is an actuator that extends and contracts as a result of a change in the magnetic field produced by an electric current through an electromagnetic coil. While such a giant magnetostrictive actuator requires application of a preload such that it is compressed in the displacement direction during operation, by arranging the giant magnetostrictive actuators such that the giant magnetostrictive actuator displacement direction lies along the blade spanwise direction and fixedly attaching one end of the actuator, which is the end at the rotor blade tip side, to the blade such that displacement of the other end of the actuator is not constrained, centrifugal force produced during rotation of the rotor blade causes application of a preload to the giant magnetostrictive actuators. As a result, the need to use a separate spring or the like to apply a preload is eliminated.

EFFECT OF INVENTION

As described in detail above, as a result of causing swing of a swing arm through the use of a pair of actuators wherein output portions are displaced in mutually reverse (opposite) phase, the present invention permits the swing arm to be made to swing stably and a flap to be driven vertically in reciprocating angular displacement fashion without causing reduction in displacement magnification factor.

What is claimed is:

1. A rotor blade flap drive apparatus comprising:
   a flap attached to a trailing edge of a blade so as to permit vertical angular displacement of the flap;
   a pair of actuators housed within the blade and having output portions which are operable to be displaced in opposite phases;
   a swing arm having a base portion coupled to the respective output portions of the pair of actuators so as to be angularly movable, and having a tip at an end of the swing arm opposite to the base portion and operable to swing in a lead direction and a lag direction; and
   a connecting rod connecting the tip of the swing arm and the flap.

2. The rotor blade flap drive apparatus of claim 1, further comprising:
   an eccentric shaft including a first shaft having a first axis and a second shaft having a second axis, the first axis and the second axis being parallel and offset from each other in a direction perpendicular to the axial direction, the first shaft and the second shaft being connected end-to-end in the axial direction to form an integral structure;
   a first support supporting the first shaft so as to permit angular displacement of the first shaft, the first support being coupled to the output portion of a first one of the actuators; and
   a second support supporting the second shaft so as to permit angular displacement, the second support being coupled to the output portion of a second one of the actuators, the swing arm being fixed to a periphery of the eccentric shaft so as to extend perpendicularly with respect to the eccentric shaft.

3. The rotor blade flap drive apparatus of claim 1, wherein the base portion has a lead-side axis and a lag-side axis extending vertically and arranged such that they are spaced apart along the lead-lag direction, the output portion of a first one of the actuators being coupled to the lead-side axis so as to permit angular displacement of the swing arm, and the output portion of a second one of the actuators being coupled to the lag-side axis so as to permit angular displacement of the swing arm.

4. The rotor blade flap drive apparatus of claim 1, wherein the swing arm comprises a pair of links, a base portion of a first one of the links being coupled to the output portion of a first one of the actuators so as to permit angular displacement of the first link, a base portion of a second one of the links being coupled to the output portion of a second one of the actuators so as to permit angular displacement of the second link, a tip of the first link and a tip of the second link being coupled so as to permit angular displacement of the links, and the connecting rod being connected to the tip of the first link and the tip of the second link.

5. The rotor blade flap drive apparatus of claim 1, further comprising a linear guide mounted within the blade and arranged so as to allow the output portion of a first one of the actuators to undergo, displacement along a displacement direction of the first actuator and so as to prevent the output portion of the first actuator from undergoing displacement in a direction perpendicular to the displacement direction of the first actuator.

6. The rotor blade flap drive apparatus of claim 1, further comprising a spring member arranged between the swing arm and the blade so as to generate a spring force when the swing arm is angularly displaced to either side of a neutral position thereof, the spring force being generated in such a direction as to encourage such angular displacement.

7. The rotor blade flap drive apparatus of claim 6, further comprising a spring actuator arranged between the spring member and the blade and operable to create a variation of the spring force from the spring, member.

8. The rotor blade flap drive apparatus of claim 1, further comprising a spring member arranged between the flap and the blade so as to generate a spring force when the flap is angularly displaced to either side of a neutral position thereof, the spring force being generated in such a direction as to encourage such angular displacement.

9. The rotor blade flap drive apparatus of claim 1, further comprising:
   a flap angular displacement shaft connecting the flap to the blade;
   an input shaft parallel to the axis of the flap angular displacement shaft and fixed to the flap angular displacement shaft eccentrically in a substantially vertical direction; and
   a rod end supporting the input shaft .so as to permit angular displacement of the input shaft, and connecting the connecting rod to the input shaft perpendicularly with respect to the axis of the input shaft.

10. The rotor blade flap drive apparatus of claim 1, wherein the actuators comprise stack-type piezoelectric actuators including a plurality of piezoelectric element sheets operable to undergo displacement corresponding to a voltage applied thereto and arranged so as to be laminated, said element sheets being arranged such that a displacement direction thereof is in a blade spanwise direction, the ends of the actuators at the blade tip side being fixed to the blade.

11. The rotor blade flap drive apparatus of claim 1, wherein the actuators comprise giant magnetostrictive actuators operable to be displaced as a result of a change in a magnetic field produced by an electric current through an electromagnetic coil, the actuators being arranged such that a displacement direction is in a blade spanwise direction, the ends of the actuators at the blade tip side being fixed to the blade.

* * * * *